United States Patent
Tokura et al.

(10) Patent No.: US 10,816,320 B2
(45) Date of Patent: Oct. 27, 2020

(54) SLEEVE POSITION INSPECTING DEVICE AND SLEEVE POSITION INSPECTING METHOD

(71) Applicants: SUMITOMO MITSUI CONSTRUCTION CO, LTD., Tokyo (JP); KYUSHU UNIVERSITY, NATIONAL UNIVERSITY CORPORATION, Fukuoka (JP)

(72) Inventors: Kentaro Tokura, Tokyo (JP); Naoki Nagamoto, Tokyo (JP); Takao Kakehashi, Tokyo (JP); Motohiro Ikehara, Tokyo (JP); Hideaki Uchiyama, Fukuoka (JP)

(73) Assignee: SUMITOMO MITSUI CONSTRUCTION CO., LTD., Fukuoka (JP)

( * ) Notice: Subject to any disclaimer, the term of this patent is extended or adjusted under 35 U.S.C. 154(b) by 0 days.

(21) Appl. No.: 16/338,157

(22) PCT Filed: Oct. 4, 2017

(86) PCT No.: PCT/JP2017/036185
§ 371 (c)(1),
(2) Date: Mar. 29, 2019

(87) PCT Pub. No.: WO2018/066614
PCT Pub. Date: Apr. 12, 2018

(65) Prior Publication Data
US 2020/0025553 A1    Jan. 23, 2020

(30) Foreign Application Priority Data

Oct. 5, 2016 (JP) .................................. 2016-196894
Mar. 2, 2017 (JP) .................................. 2017-039055

(51) Int. Cl.
*G01B 11/00* (2006.01)
*E04G 15/06* (2006.01)
(Continued)

(52) U.S. Cl.
CPC .............. *G01B 11/00* (2013.01); *E04G 15/06* (2013.01); *G01C 15/06* (2013.01); *G01S 17/89* (2013.01); *E04B 2001/1948* (2013.01)

(58) Field of Classification Search
None
See application file for complete search history.

(56) References Cited

U.S. PATENT DOCUMENTS 7,511,805 B2    3/2009    Hinderling et al.

FOREIGN PATENT DOCUMENTS

JP    H11153438    6/1999
JP    H11325318    11/1999
(Continued)

OTHER PUBLICATIONS

International Preliminary Report on Patentability dated Apr. 4, 2019 for corresponding PCT Application No. PCT/JP2017/036185.

*Primary Examiner* — Michelle M Iacoletti
(74) *Attorney, Agent, or Firm* — Duane Morris LLP (57) ABSTRACT

[Problem] When inspecting whether each sleeve is in the correct position, to alleviate the burden on an operator and reduce the inspection time.
[Solution] When an operator captures an image of a reference marker 3 or a sleeve marker 4 using a camera C, the image is sent to a sleeve marker position analyzing means 5 for the position of each sleeve marker 4, . . . to be analyzed. Then, a sleeve marker position assessing means 6 assesses whether the position of each sleeve marker 4, . . . is suitable, by superimposing the resulting analysis data and a BIM model stored in a BIM model storage means 2. Since it is (Continued)

sufficient for the operator to capture an image of the reference marker 3 or the sleeve marker 4 using the camera C, the burden on the operator can be alleviated, and the inspection time can also be reduced.

4 Claims, 5 Drawing Sheets

(51) Int. Cl.
*G01C 15/06* (2006.01)
*G01S 17/89* (2020.01)
*E04B 1/19* (2006.01)

(56) References Cited

FOREIGN PATENT DOCUMENTS

| | | |
|---|---|---|
| JP | 2007-071014 | 3/2007 |
| JP | 2009-517636 | 4/2009 |
| JP | 2010-008347 | 1/2010 |
| JP | 2013-142247 | 7/2013 |
| JP | 2015-232203 | 12/2015 |
| JP | 2016-121450 | 7/2016 |

SLEEVE POSITION INSPECTING DEVICE AND SLEEVE POSITION INSPECTING METHOD

TECHNICAL FIELD

This invention relates to a sleeve position inspecting device and a sleeve position inspecting method for inspecting a position of at least one sleeve before placing concrete, which is attached to reinforcing bars before placing concrete in order to form a through-hole at a concrete structure.

BACKGROUND ART

In a building made by reinforced concrete, it is necessary to provide various pipes for water, gas and ventilation and an electric wiring, and for this reason, cylindrical members, called sleeves have been mounted to the reinforcing bars before placing concrete, and through-holes have been formed at beams and walls after placing concrete (see patent related documents 1 and 2, for instance).

A worker has inspected as to whether each sleeve is located at a proper position before placing concrete with scales, such as a convex (measure) and a metal ruler.

PATENT RELATED DOCUMENT

Patent related document 1: Japanese patent application publication No. 2007-071014
Patent related document 2: Japanese patent application publication No. 2013-142247

SUMMARY OF INVENTION

Problems to be Solved by Invention

But, when using scales, careful inspection is necessary so that mistakes do not occur, and burdens are applied to a worker and it takes a longer time for such reasons. Besides, since processes of the inspection are not automatically recorded, so that there is such a problem that it is not possible to verify the processes of the inspection after placing concrete.

An object of the invention is to provide the sleeve position inspecting device and the sleeve position inspecting method in order to solve the above-mentioned problems.

Means for Solving Problems

Figure 1:
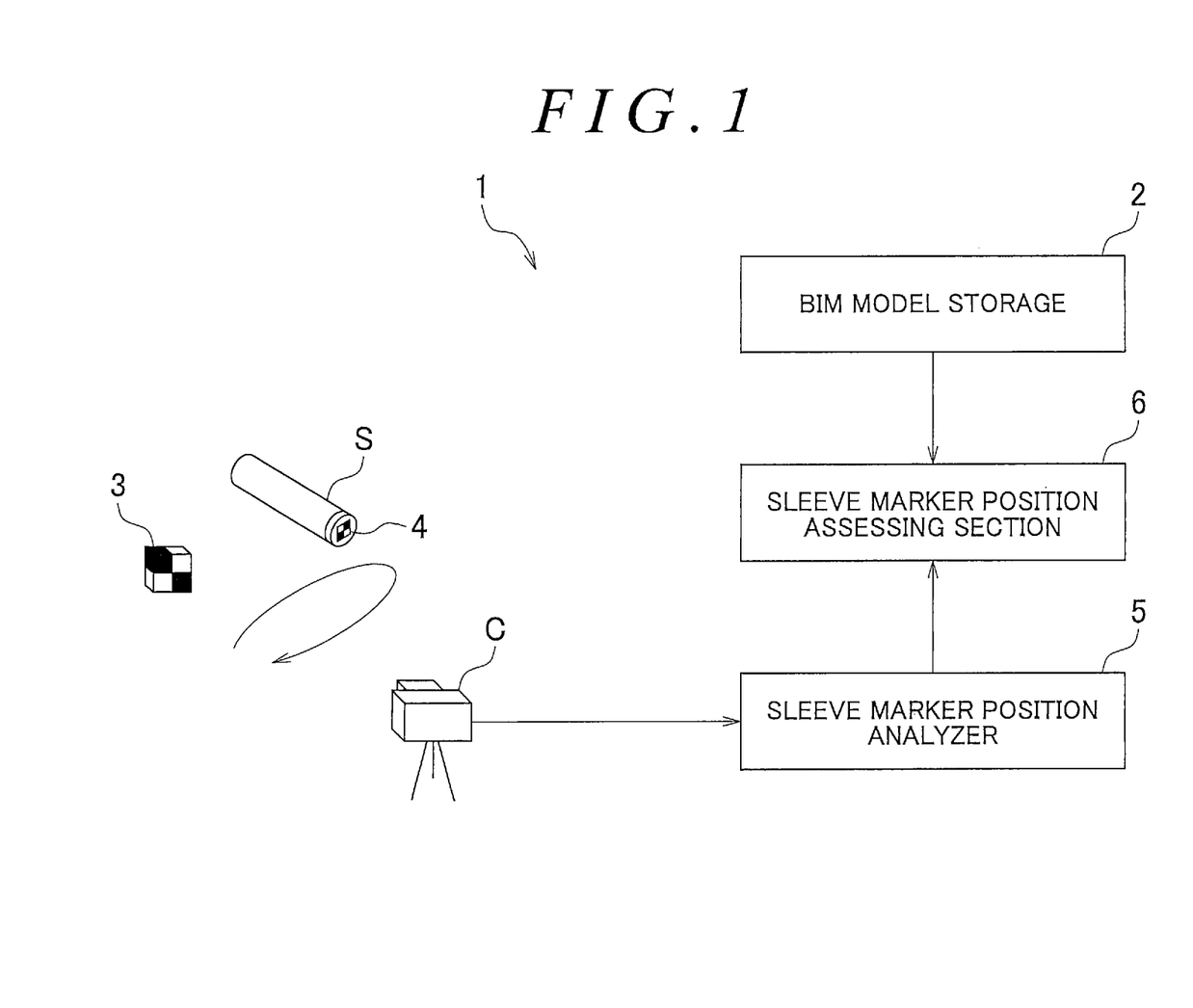
FIG. 1 is a block diagram that shows an instance of the whole configuration of a sleeve position inspecting device according to the invention.
Figure 2:
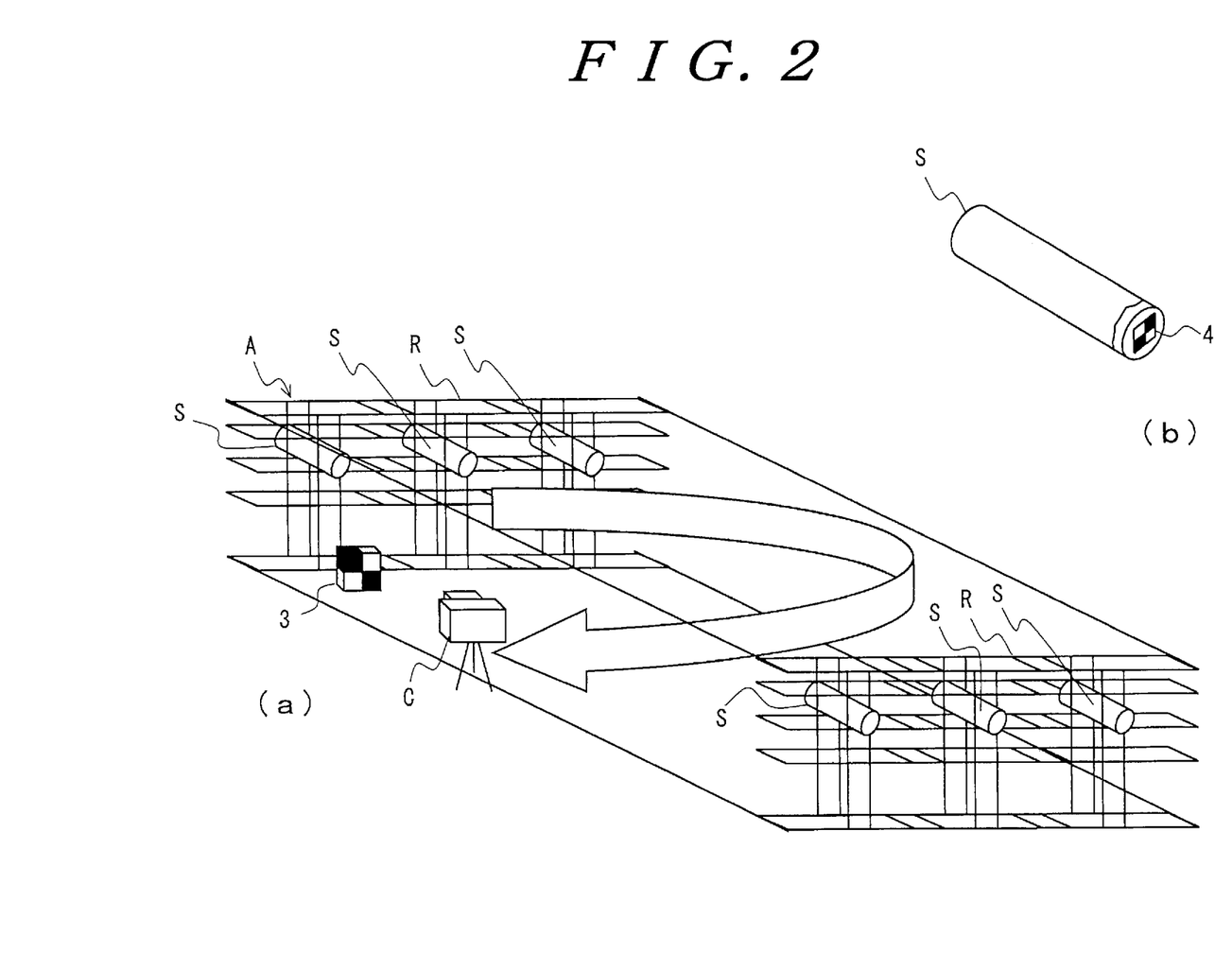

As exemplarily shown in FIGS. 1 and 2, the first aspect of the invention is a sleeve position inspecting device (1) for inspecting a position of at least one sleeve (S) before placing concrete, at least one sleeve (S) being attached to reinforcing bars before placing concrete (see a reference number R in FIG. 2(a)) in order to form a through-hole at a concrete structure, said sleeve position inspecting device comprising:
when a structure (A) comprised of the reinforcing bars (R) and the sleeve (s) before placing concrete is referred to as a reinforcement structure;
a BIM model storage (2) that stores a BIM model of the reinforcement structure (A) or the above-mentioned concrete structure;
a reference marker (3) that is located inside the reinforcement structure (A) or at its neighborhood, and located at a position known by the BIM model;
a sleeve marker (4) that is set on the sleeve (S) in order to measure a position of the sleeve (S);
a sensing device (C) that senses the reference marker (3) and at least one sleeve marker (4) in this order, and senses the reference marker (3) again after sensing these markers (3, 4);
a sleeve marker position analyzer (5) that analyzes a position of the sleeve marker (4) that is associated with the reference marker (3) based on data obtained by sensing through the sensing device (C); and
a sleeve marker position assessing section (6) that determines whether the position of the sleeve marker (4) analyzed through the sleeve marker position analyzer (5) is correct or not in comparison to the BIM model stored in the BIM model storage (2).

The second aspect of the invention is the sleeve position inspecting device, wherein the sleeve marker (4) is an image that is coded with information regarding an ID or a radius/diameter of the sleeve (S) on which the sleeve marker (4) is set.

As exemplarily shown in FIGS. 3(a) to (c), the third aspect of the invention is the sleeve position inspecting device, wherein the sleeve marker (4) is located on an adhesive sheet (7) that, when affixed to the sleeve, closes an opening (Sa) of the sleeve (S).

The fourth aspect of the invention is the sleeve position inspecting device, wherein the shape (Sb) of the opening (Sa) of the sleeve (S) is drawn on the adhesive sheet (7).

As exemplarily shown in FIGS. 4(a) to (c), the fifth aspect of the invention is the sleeve position inspecting device, wherein the sleeve marker (4) is located on a side adhesive sheet (17, 27, 37) to be attached on a side (Sc) of the sleeve (S).

The sixth aspect of the invention is the sleeve position inspecting device, wherein the sleeve marker (4, . . . ) located on the side adhesive sheet (17, 27, 37) owns a distance between the side adhesive sheet (17, 27, 37) and an edge of the sleeve (S) on which the side adhesive sheet (17, 27, 37) is attached, and a radius of the sleeve (S) as information.

The seventh aspect of the invention is the sleeve position inspecting device, wherein the side adhesive sheet (37) has a marker section (37a) on which the sleeve marker (4) is located, an extending section (37b), that is located adjacent to the marker section (37a), extending to the edge of the sleeve (S) on which the side adhesive sheet (37) is attached, and an opening closure (37c) that is located adjacent to the extending section (37b), closing the sleeve opening (Sa).

The eighth aspect of the invention is the sleeve position inspecting device, wherein the sensing device (C) is a camera, a LiDAR device or a hand-held scanner.

The ninth aspect of the invention is a sleeve position inspecting method for inspecting a position of at least one sleeve (S) before placing concrete, at least one sleeve (S) being attached to reinforcing bars (R) before placing concrete in order to form a through-hole at a concrete structure, said method comprising:
when a structure (A) comprised of the reinforcing bars (R) and the sleeve (S) before placing concrete is referred to as a reinforcement structure (A),
a routine (S1 in FIG. 5) of storing a BIM model of the reinforcement structure (A) or the concrete structure;
a routine (S2) of setting a reference marker (3) at a position known by the BIM model near or inside the reinforcement structure (A);
a routine (S3) of setting the sleeve marker (4) on the sleeve (S) in order to measure a position of the sleeve (S);
a routine (S4) of sensing the reference marker (3) and at least one sleeve marker (4) through a sensing device (C) in this order and sensing the reference marker (3) through the sensing device (C) again after sensing these markers (3, 4);

a routine (S5) of analyzing the position of the sleeve marker (4) associated with the reference marker (3) from data obtained by sensing through the sensing device (C); and a routine (S6) of judging as to whether the analyzed position of the sleeve marker (4) is correct by collating with the BIM model.

The tenth aspect of the invention is the sleeve position inspecting method, wherein the sleeve marker (4) is an image that is coded with information regarding an ID or a radius/diameter of the sleeve (S) on which the sleeve marker (4) is set.

The eleventh aspect of the invention is the sleeve position inspecting method, wherein the sleeve marker (4) is located on the adhesive sheet (7) that closes the opening (Sa) of the sleeve (S).

The twelfth aspect of the invention is the sleeve position inspecting method, wherein the sensing device (C) is a camera, a LiDAR device or a hand-held scanner.

The number in parentheses shows the corresponding element in the drawings for the sake of convenience, accordingly, the descriptions are not restricted and bound by the descriptions on the drawings.

Effects of Invention

According to the $1^{st}$, $2^{nd}$, $8^{th}$, $9^{th}$, $10^{th}$ and $12^{th}$ aspects of the invention, the BIM model storage, the sleeve marker position analyzer and the sleeve marker position assessing section automatically judge whether each sleeve is at a correct position, and it is sufficient for a worker to sense the reference marker and the sleeve marker through the sensing device. Then, the burden on the worker can be alleviated, and the inspection time can also be reduced. And, only sensing through the sensing device is necessary at a construction site. For this reason, a time to occupy the construction site for the inspection can be made shorter than the past and it is possible to minimize obstacles to the other works excluding the inspection (construction works). Besides, it is possible to do works after sensing the reinforcement structure at a place excluding the construction site, such as the place where there are desks, chairs and a good work environment, thereby improving work efficiency. Furthermore, it is possible to verify the inspection routines at any time if the analyzed result of the sleeve marker position analyzer and the judgment result of the sleeve marker position assessing section are automatically stored.

According to the $3^{rd}$ and $11^{th}$ aspects of the invention, it is possible to attach the sleeve marker to the sleeve and close the sleeve opening in a single operation and it is not necessary to close the sleeve opening by a gummed tape, thereby simplifying the works.

According to the $4^{th}$ aspect of the invention, a worker who attaches the adhesive sheet to the opening of a sleeve is able to visually confirm whether the shape of the sleeve opening that is drawn on the adhesive sheet corresponds to the actual sleeve opening in order to prevent an attachment mistake of the opening adhesive sheet.

According to the $5^{th}$ and $6^{th}$ aspects of the invention, it is possible to obtain the position of the opening center of the sleeve opening from the information owned by the sleeve marker.

According to the $7^{th}$ aspect of the invention, it is possible to attach the side adhesive sheet at a proper position based on the edge of the sleeve or the sleeve opening, and to obtain the position of the opening center of the sleeve opening from the information owned by the sleeve marker.

BRIEF DESCRIPTION OF DRAWINGS

FIG. 2 (a) is a typical view that shows an instance of a way of inspecting through the sleeve position inspecting device according to the invention, and FIG. 2(b) is a perspective view that exemplarily shows a shape of a sleeve.

FIG. 3 (a) through (c) are perspective views each showing a way of attaching an adhesive sheet to a sleeve opening.

FIG. 4 (a) through (c) are perspective views that show three instances of side adhesive sheets.

EMBODIMENTS FOR CARRYING OUT THE INVENTION

Embodiments of the invention are mentioned, referring to appended drawings FIGS. 1 to 5.

A sleeve position inspecting device according to the invention is one for inspecting a position of at least one sleeve (see reference numeral S of FIG. 2(a), (b)) before placing concrete, that is mounted at reinforcing bars (see reference numeral R of FIG. 2(a)) before placing concrete in order to form through-holes at beams and walls of a reinforced concrete building (concrete structure). In such a case, the through-holes are ones for gas piping and electric wiring, and the sleeves S are rectangular cylindrical ones in addition to cylindrical ones, for instance.

The sleeve position inspecting device according to the invention is one that is exemplarily shown with a reference numeral 1, and has, when a structure A comprised of the reinforcing bars R and the sleeves S before placing concrete is referred to as "a reinforcement structure", a BIM model storage 2 that stores a BIM model (three-dimensional digital model for a design of a building) of the reinforcement structure A or the above-mentioned concrete structure, a reference marker 3 that is located inside the reinforcement structure A or at its neighborhood, and at a position known by the BIM model, a sleeve marker 4 that is set on the sleeve S in order to measure the position of the sleeve S, a sensing device C that senses the reference marker 3 and the sleeve marker 4, a sleeve marker position analyzer 5 that analyzes the position of the sleeve marker 4 that is associated with the reference marker 3 based on data obtained by sensing through the sensing device C (for instance, images obtained through a camera), and a sleeve marker position assessing section 6 that judges whether the position of the sleeve marker 4 is correct or not, collating with the BIM model in such a manner that the position of the sleeve marker 4 that is analyzed through the sleeve marker position analyzer 5 is superimposed on the BIM model stored in the BIM model storage 2. The sensing device C senses these markers 3, 4, . . . in the order of the reference marker 3, one or more sleeve markers 4, . . .

the reference marker 3.

That is, the above-mentioned sensing device C senses the reference marker 3 and at least one sleeve marker 4 in this order, and after that, senses the reference marker 3 again. Such a sensing device C are:
- a camera for obtaining images by imaging (by sensing) the respective markers,
- a LiDAR device that senses the respective markers, and
- a hand-held scanner that scans (senses) the respective markers, such as a hand-held scanner with infrared rays.

The reference marker 3 has at least information showing being the reference marker (ID information) and a target mark, and is an image code recognizable from the image obtained through the camera C, for instance. The ID information may be owned by a bar code, a QR code (registered trademark) or another two-dimensional code, and the target mark may have any shape.

The sleeve marker 4 may be a code that has at least
- a target mark,
- ID information of the sleeve S on which the sleeve marker 4 is set,
- information as to radius or diameter of the sleeve S when it is a cylinder, and a dimension from a side to a center of opening of the sleeve S when it is a rectangular cylinder, and
- information as to a length of the sleeve S on which the sleeve marker 4 is set, and may be an image code making use of letters, signs, shapes of figures or colors.

The sensing device C that is exemplarily shown in FIG. 1 and FIG. 2(*a*) is set on a tripod, but the hand-held type may be also used in addition to the tripod type. Besides, in case where the camera is used as the sensing device, the reference marker 3 or the sleeve marker 4 may be imaged as a moving image, or successive still images.

And, the BIM model may have at least ID information of the each sleeve S, information as to the radius/diameter or the length thereof, and information as to an arrangement position (the coordinate).

Furthermore, the sleeve marker position analyzer 5 obtains information as to
- to which direction the sensing device C moves
- at which speed the sensing device C moves on the basis of the data obtained by sensing through the sensing device C.

Besides, the sleeve marker position analyzer 5 is configured to estimate the position of the sensing device C and the positions of the respective sleeve markers 4, based on the data obtained by sensing through the sensing device C, and to form a map through which the positons of the reference marker 3 and the sleeve markers 4, are known on the basis of information regarding movements of the sensing device itself, such as information to which direction it moves, and at which speed it moves. That is, this sleeve marker position analyzer 5 is configured to compute an amount of a change in position/posture of the sensing device C and a three-dimensional shape of a characteristic point from a moving amount of "some object" of the data obtained by sensing through the sensing device C.

According to the invention, the above-mentioned BIM model storage 2, the sleeve marker position analyzer 5 or the sleeve marker position assessing section 6 automatically judges as to whether each sleeve S is on a correct position or not, and it is sufficient for a worker to sense the reference marker 3 or the sleeve marker 4 using the sensing device C, the burden on the worker can be alleviated, and the inspection time can also be reduced. In addition, it is sufficient to sense these markers through the sensing device C, it is possible to shorten a time to occupy a working spot for the purpose of the inspection as compared to a conventional one, and to minimize obstructions for other works excluding the inspection (construction works). In addition, it is possible to improve a working efficiency since works after sensing the reinforcement structure A can be done at a place excluding the working spots (the place where desks and chairs are present, having a good working environment). Furthermore, it is possible to verify inspection processes at any time if the analysis result through the sleeve marker position analyzer 5 and the judgment result through the sleeve marker position assessing section 6 are automatically stored.

Figure 3:
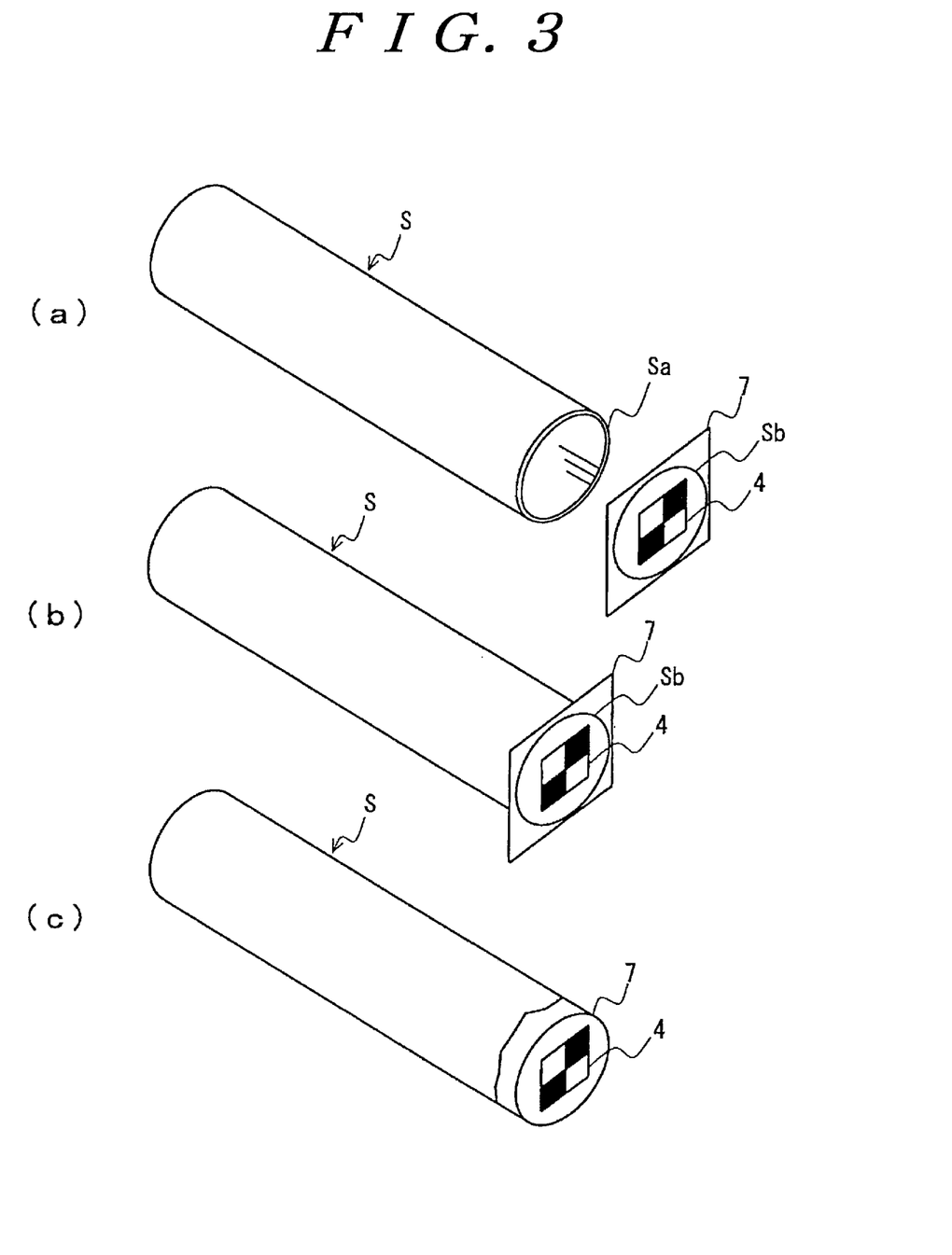

As exemplarily shown in FIGS. 3(*a*) through (*c*), preferably, the sleeve marker 4 is located on (formed on or attached on) an adhesive sheet 7 that, when attached to the sleeve S ("the sleeve opening" hereinafter), closes an opening of the sleeve S. In the past, the sleeve opening Sa has been closed by attaching a gummed tape thereto. In this embodiment, it is possible to attach the sleeve marker 4 to the sleeve S and to close the sleeve opening Sa in a single operation and it is not necessary to close the sleeve opening Sa by a gummed tape, thereby simplifying the works. In such a case, preferably, the shape Sb of the sleeve opening Sa to be closed is drawn on a portion of the adhesive sheet 7 closing the sleeve opening Sa. By doing so, a worker who attaches the adhesive sheet 7 is able to visually confirm whether the shape Sb of the sleeve opening that is drawn on the adhesive sheet 7 corresponds to the actual sleeve opening Sa to prevent mistakenly attaching wrong adhesive sheet 7.

Figure 4:
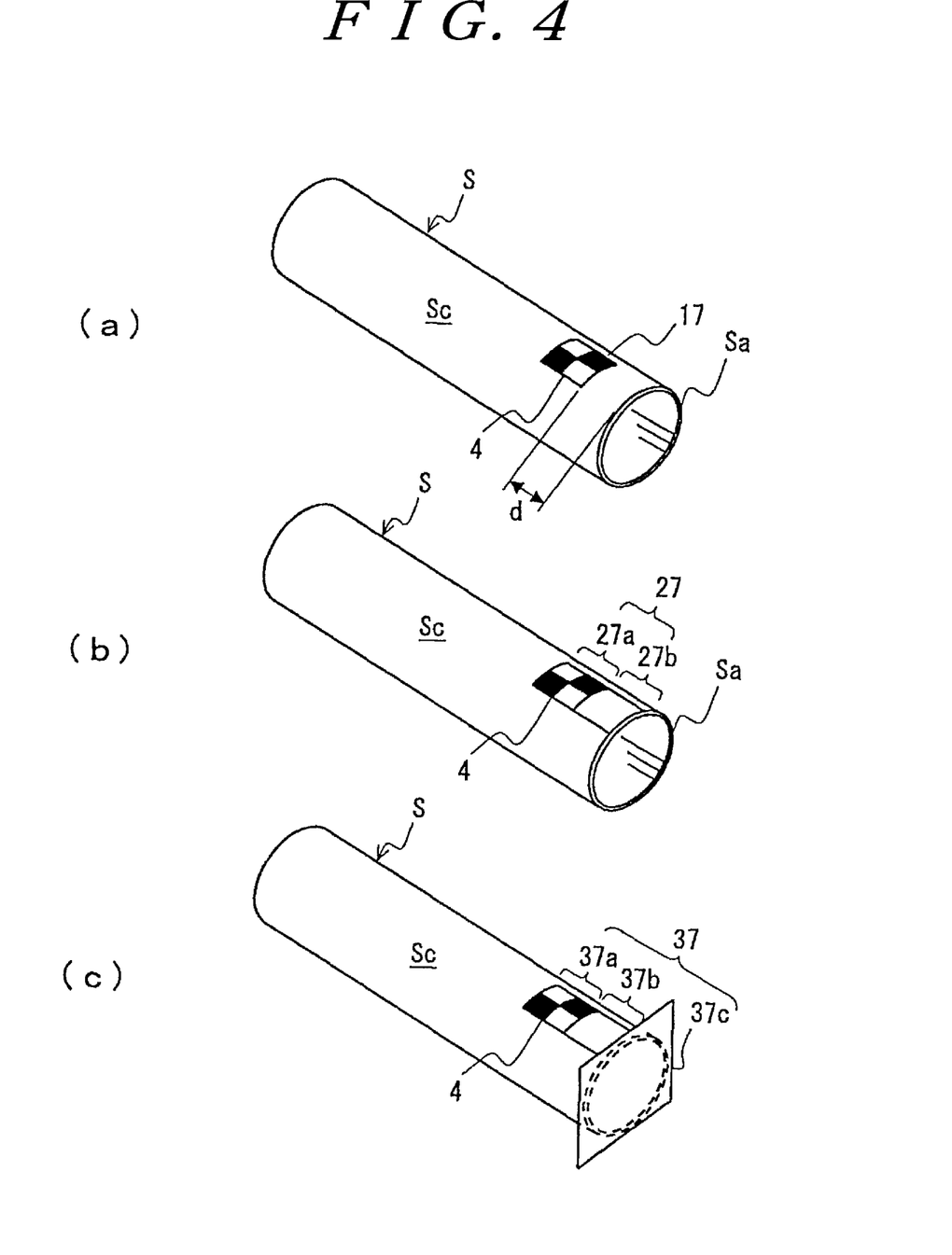

Although the above-mentioned adhesive sheet 7 may be attached to the sleeve S that is located at a position where the sensing device C detects the sleeve opening Sa in the above-mentioned reinforcement structure A, for the sleeve S located at a position where its sleeve opening Sa is not detected by the sensing device C, the sleeve marker 4 is preferably located on a side adhesive sheet 17 to be attached on a side Sc of the sleeve S, as exemplarily shown in FIG. 4(*a*). Preferably, the sleeve marker 4 located at the side adhesive sheet 17 is an image that is coded with information, such as ID information of the sleeve S on which the side adhesive sheet 17 is attached, distance d between the side adhesive sheet 17 and an edge of the sleeve S on which the side adhesive sheet 17 is attached, a radius/diameter of the sleeve S when it is a circular cylinder or a dimension from the side of the sleeve S to a center of the opening of the sleeve S when it is a square cylinder, and a length of the sleeve S on which the side adhesive sheet 17 is attached, at least as well as the target mark. By doing so, it is possible to obtain the position of the center of the sleeve opening Sa from the information coded on the sleeve marker 4. Besides, as exemplarily shown with a reference number 27 of FIG. 4(*b*), the side adhesive sheet may have a marker section 27*a* on which the sleeve marker 4 is located, and an extending section 27*b*, that is located adjacent to the marker section 27*a*, extending to the edge of the sleeve S in a state of being attached on the side Sc. Preferably, the sleeve marker 4 located on the marker section 27*a* is an image that is coded with information, such as ID information of the sleeve S on which the side adhesive sheet 27 is attached, a distance d between the side adhesive sheet 27 and an edge of the sleeve S on which the side adhesive sheet 27 is attached, a radius/diameter of the sleeve S when it is a circular cylinder or a dimension from the side of the sleeve to a center of the opening of the sleeve S when it is a square cylinder, and a length of the sleeve S on which the side adhesive sheet 17 is attached, at least as well as the target mark. By doing so, it is possible to attach the side adhesive sheet 27 at a proper position based on the edge of the sleeve S and to obtain the position of the center of the sleeve opening Sa from the information owned by the sleeve marker 4. Furthermore, as exemplarily shown with a reference number 37 of FIG. 4(*c*), the side adhesive sheet may have a marker section 37*a* on which the sleeve marker 4 is located, an extending section 37*b*, that is located adjacent to the marker section 37*a*, extending to the edge of the sleeve S in a state of being attached on the side Sc, and an opening closure 37*c* that is located adjacent to the extending section 37*b*, closing the sleeve opening Sa. Preferably, the sleeve marker 4 located on the marker section 37*a* is an image that is coded with information, such as ID information of the sleeve S on which the side adhesive sheet 37 is attached, a distance d between the side adhesive sheet 37 and an edge of the sleeve S on which the side adhesive sheet 37 is attached, a radius/diameter of the sleeve S when it is a circular cylinder or a dimension from the side of the sleeve S to a center of the opening of the sleeve S when it is a square cylinder, and a length of the sleeve S on which the side adhesive sheet 17 is attached, at least as well as the target mark. By doing so, it is possible to attach the side adhesive sheet 37 at a proper position based on the edge of the sleeve S or the sleeve opening Sa and to obtain the position of the center of the sleeve opening Sa from the information owned by the sleeve marker 4. It is necessary to form a slit at a boundary section between the extending section 37*b* and the opening closure 37*c* of the side adhesive sheet 37 as exemplarily shown in FIG. 4(*c*) in order to attach the marker section 37*a* and the extending section 37*b* to the side Sc of the sleeve S without wrinkles, and such a slit may be formed at a time of preparing the side adhesive sheet 37, or a worker may form the slit when attaching the side adhesive sheet 37 to the sleeve S. Preferably, the whole shape of the sleeve opening Sa on which the opening closure 37*c* is attached (the shape as shown with a reference number Sb in FIGS. 3(*a*) and (*b*)) is drawn on the opening closure 37*c*. By doing so, it is possible for a worker who attaches the opening closure 37*c* to easily visually confirm as to whether the shape or the size of the sleeve opening Sa drawn on the opening closure 37*c* corresponds to the actual one, and it is possible to prevent mistakenly attaching a wrong side adhesive sheet 37. The opening closure 37*c* may partially close the sleeve opening Sa without fully closing it, and a part of the sleeve opening Sa may be drawn on the opening closure 37*c*.

Figure 5:
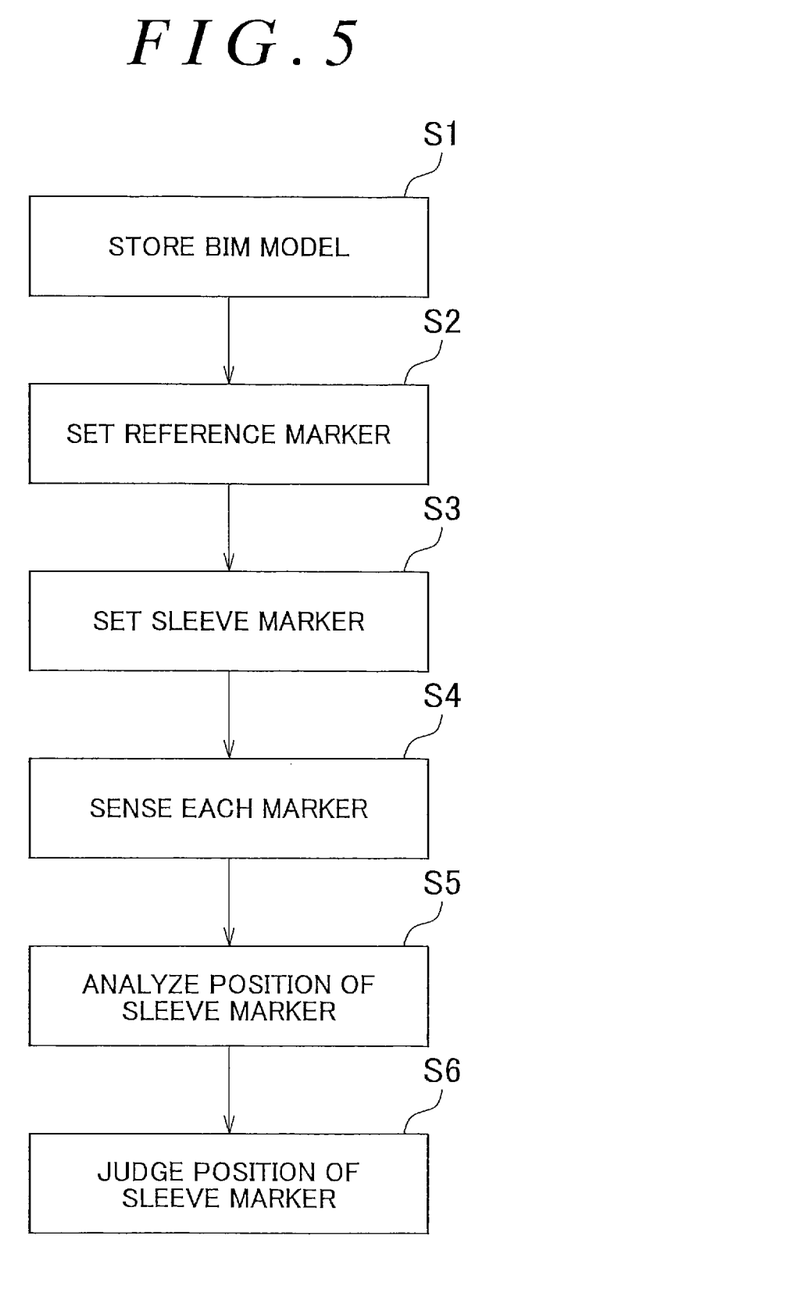
FIG. 5 is a flowchart that shows an instance of a sleeve position inspecting method according to the invention.

On the other hand, a sleeve position inspecting method according to the invention is one for inspecting a position of at least one sleeve before placing concrete, which is attached to reinforcing bars R before placing concrete in order to form a through-hole at the concrete structure, and has a routine S1 of storing the BIM model of the reinforcement structure A or the concrete structure, a routine S2 of setting the reference marker 3 at a position known by the BIM model near or inside the reinforcement structure A, a routine S3 of setting the sleeve marker 4 on the sleeve S in order to measure the position of the sleeve S, a routine S4 of sensing the reference marker 3 and at least one sleeve marker 4 through the sensing device C in this order and sensing the reference marker 3 through the sensing device C again after sensing these markers 3 and 4, a routine S5 of analyzing the position of the sleeve marker 4 associated with the reference marker 3 from data obtained by sensing through the sensing device C, and a routine S6 of judging as to whether the analyzed position of the sleeve marker 4 is correct by collating with the BIM model, as exemplarily shown in FIG. 5.

According to the invention, the BIM model storage 2, the sleeve marker position analyzer 5 or the sleeve marker position assessing section 6 automatically judges whether each sleeve S is at a correct position, and it is sufficient for the worker to sense the reference marker 3 and the sleeve marker 4 through the sensing device C. Then, the burden on the worker can be alleviated, and the inspection time can also be reduced. And, the sensing through the sensing device C is sufficient at a construction site. For this reason, a time to occupy the construction site for the inspection can be made shorter than the past and it is possible to minimize obstacles to the other works excluding the inspection (construction works). Besides, it is possible to do works after sensing the reinforcement structure A at a place excluding the construction site, such as the place where there are desks, chairs and a good work environment, thereby improving work efficiency. Furthermore, it is possible to verify the inspection processes at any time if the analyzed result of the sleeve marker position analyzer 5 and the judgment result of the sleeve marker position assessing section 6 are automatically stored.

Preferably, the sleeve marker 4 is an image that is coded with at least a target mark, ID information of the sleeve S on which the sleeve marker 4 is set, and information as to diameter/radius of the sleeve S when it is a circular cylinder and a dimension from the side of the sleeve to the opening center when it is a square cylinder, and information as to the length of the sleeve S on which the sleeve marker 4 is set, and is an image code using letters, symbols and shapes of figures, and colors. Besides, preferably, the sleeve marker 4 is located (formed or attached) on the adhesive sheet 7 that closes the sleeve opening Sa, as exemplarily shown in FIG. 3(*a*) through (*c*).

EXPLANATION OF REFERENCE NUMBERS

1 Sleeve position inspecting device
2 BIM model storage
3 Reference marker
4 Sleeve marker
5 Sleeve marker position analyzer
6 Sleeve marker position assessing section
7 Opening adhesive sheet
17, 27, 37 Side adhesive sheet
37*a* Marker section
37*b* Extending section
37*c* Opening closure
A Reinforcement structure
C Sensing device (camera, LiDAR device, hand-held scanner)
R Reinforcing bar
S Sleeve
Sa Sleeve opening
Sc Side

The invention claimed is:

1. A method for inspecting a position of at least one sleeve attached to reinforcing bars in a reinforcement structure before pouring concrete to the reinforcement structure to form a concrete structure, wherein the at least one sleeve form through-holes in the concrete structure, said method comprising:

storing a BIM model of the reinforcement structure or the concrete structure, wherein the BIM model contains desired positions for the at least one sleeve in the reinforcement structure;

setting a reference marker at a position known by the BIM model, wherein the position is near or inside the reinforcement structure;

setting a sleeve marker on the at least one sleeve, wherein the sleeve marker represents the position of the at least one sleeve in the reinforcement structure;

sensing the position of the reference marker using a sensing device;

sensing the position of the sleeve marker using the sensing device;

sensing the position of the reference marker again using the sensing device;

determining the position of the sleeve marker in the reinforcement structure with respect to the position of the reference marker from data obtained by the sensing device; and determining whether the position of the sleeve marker is correct in comparison to the BIM model.

2. The method of claim 1, wherein the sleeve marker is an image that is coded with information regarding an ID or a radius/diameter of the sleeve on which the sleeve marker is set.

3. The method of claim 1, wherein the sleeve marker is located on an adhesive sheet that, when affixed to the adhesive, closes an opening of the sleeve.

4. The method of claim 1, wherein the sensing device is one of a camera, a LiDAR device or a hand-held scanner.

* * * * *

UNITED STATES PATENT AND TRADEMARK OFFICE
CERTIFICATE OF CORRECTION

PATENT NO. : 10,816,320 B2  
APPLICATION NO. : 16/338157  
DATED : October 27, 2020  
INVENTOR(S) : Tokura et al.

Page 1 of 1

It is certified that error appears in the above-identified patent and that said Letters Patent is hereby corrected as shown below:

On the Title Page

Item (73), Assignee immediately following:  
SUMITOMO MITSUI CONSTRUCTION CO., LTD.  
Please add:  
-- KYUSHU UNIVERSITY, NATIONAL UNIVERSITY CORPORATION --

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*